March 15, 1966 H. W. BRYANT 3,240,879

ALARM CIRCUITS IN PORTABLE RADIO TELEPHONE SYSTEM

Filed Dec. 18, 1962

INVENTOR
H. W. BRYANT
BY [signature]
ATTORNEY

United States Patent Office 3,240,879
Patented Mar. 15, 1966

3,240,879

ALARM CIRCUITS IN PORTABLE RADIO TELEPHONE SYSTEM

Herbert W. Bryant, Middletown, N.J., assignor to Bell Telephone Laboratories, Incorporated, New York, N.Y., a corporation of New York Filed Dec. 18, 1962, Ser. No. 245,450
8 Claims. (Cl. 179—41)

Figure 1:
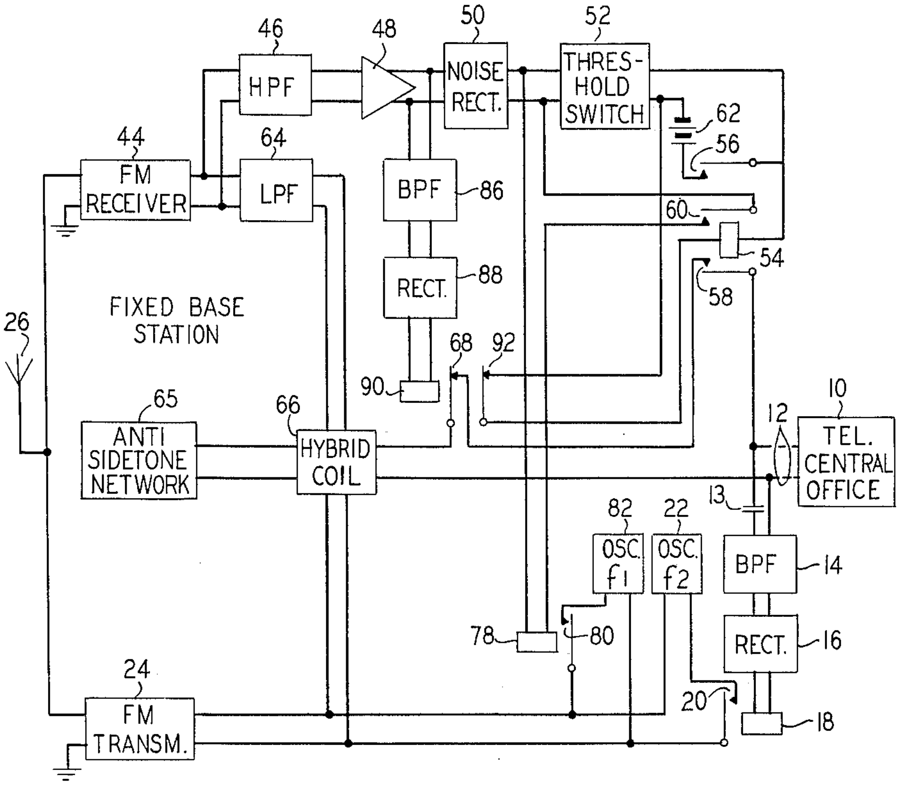

This invention relates to wireless telephone systems and more particularly to alarm circuits arranged to monitor and report the condition of the transmission links existing between stations in such a system.

An advantageous use of the principles of radio or inductive-coupling telephony is found in providing telephone service through a wireless link between a telephone central office and a portable telephone station to customers moving about in an area too wide to make wire connection to the telephone practical. Potential users of such a system include workers on construction sites whose activities carry them from place to place and peripatetic personnel in large office buildings or hospitals. United States Patent 2,894,121 to R. P. Phillips, issued July 7, 1959, discloses a radio link interconnecting such a wireless portable telephone station with a telephone central office.

As in most communication systems, it is imperative for satisfactory operation of wireless telephone systems that the transmission link between terminal stations remain intact during the entire calling operation, including periods of transmission of both speech and the conventional telephone signaling functions. Because the customer is mobile and the broadcasting range is restricted the likelihood of interruption of the wireless link between the portable telephone and the central office is much greater, however, than in other types of communication systems and is even greater than that in fixed terminal radio links. Thus, it is extremely desirable that such a wireless telephone system have the capability of alerting the customer using the portable telephone station of loss of wireless contact. Then the customer can take steps to re-establish wireless contact by relocating himself within range of the fixed base station associated with the central office.

It is therefore the objects of the present invention simply and effectively to alert the user of a portable wireless telephone station at any time throughout the calling operation of impairment of the wireless link with a cooperating base station or telephone central office.

In accordance with the above object, a telephone central office is connected via conventional wire transmission lines to a fixed base station located in the vicinity where portable telephone service is desired. A portable telephone station is provided having a transmitter and receiver, making possible radio or inductive contact with a similar transmitter and receiver located at the fixed station. The condition of the carrier received by the portable station from the transmitter at the fixed station is sensed at the portable station. When this carrier expires or diminishes below a tolerable level, signifying that the wireless link from the fixed station to the portable station is impaired, an alarm is actuated to alert the user of the portable station. The condition of the carrier received at the fixed station from the portable station transmitter is similarly sensed at the fixed station. When this carrier ceases or falls below a tolerable level during a call involving the portable station, an alarm is generated at the fixed station and transmitted to the portable station where it alerts the mobile customer that the wireless link has become impaired.

Indication to the telephone central office of the status, i.e., busy or idle, of the telephone line is controlled by the portable station, both as to incoming and outgoing calls. Upon termination of the call by the user of the portable station, a command signal is generated at the portable station and transmitted to the fixed station where it actuates a conventional indication informing the central office that the telephone line is idle. In the event that the indication fails to occur due to loss of wireless contact, an alarm is generated at the fixed station and transmitted to the portable station to alert the user thereof that his command to indicate an idle line was ineffectual. Thus, the user of the portable station can take action to regain wireless contact and re-execute the command indicating an idle line to the central office. Were it not for the last-mentioned alarm, further calls from the central office to the portable station would be impossible to make, if the wireless link fails during transmission of the command signal, because a busy line status is represented to the central office and the user of the portable station thinks that an idle line is represented to the central office.

Figure 2:
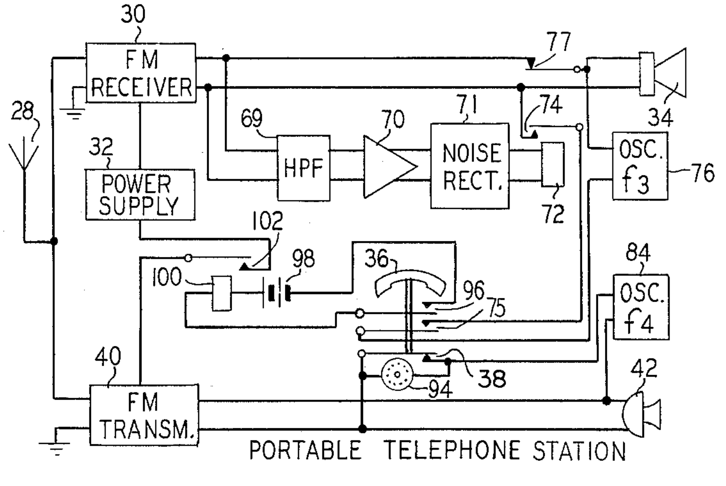

These and other features of the invention will become fully apparent from the following detailed description considered in conjunction with the drawing in which:

FIG. 1 is a schematic diagram in block form of a telephone central office is interconnected to a fixed or base station for carrying on radio communication with a portable telephone station; and FIG. 2 is a schematic diagram in block form of the portable telephone station with which the fixed station of FIG. 1 engages in radio communication.

In FIG. 1 a conventional telephone central office 10 is interconnected to a fixed radio base station, located in the vicinity of a mobile telephone customer, by means of any standard telephone transmission link 12. A frequency modulation radio link to a portable radio telephone station, such as that in FIG. 2, is provided in part by a frequency modulation transmitter 24 and a frequency modulation receiver 44 located at the fixed terminal. Any other form of modulation or mode of wireless transmission, i.e., inductive coupling could, of course, be employed to convey information between the two stations.

When a call is initiated from central office 10, a ringing signal in the form of a 20-cycle per second tone is sent from central office 10 over line 12 to the fixed station where it is transmitted through a direct-current blocking capacitor 13 and a bandpass filter 14, rectified in a rectifier 16, and employed to energize the coil of a relay 18. Bandpass filter 14 is highly frequency selective to prevent actuation of relay 18 by speech. The energization of the coil of relay 18 closes an associated contact pair 20, thus applying the output, $f_2$, of an audio-frequency oscillator 22 to the input of radio transmitter 24. The resulting frequency modulated signal is applied to an antenna 26 which broadcasts radio energy into the surrounding area. An antenna 28 at the portable station, shown in FIG. 2, intercepts a portion of the energy transmitted from antenna 26 and delivers it to a frequency modulation receiver 30. The demodulated output from receiver 30, which is oscillator signal $f_2$, is applied as a summoning signal through a normally closed contact pair 77 of a relay 72 to a loudspeaker 34.

The user of the portable unit, being alerted by the summoning signal emanating from loudspeaker 34, removes his handset 36 from its hook, thus closing contact pairs 96 and 75 and opening a contact pair 38. Contact pair 96 completes a path for energy flow from a battery 98 to the coil of a relay 100. Energization of the coil of relay 100 causes an associated contact pair 102 to close, connecting a power supply 32 to energize a frequency modulation transmitter 40. The application of power to transmitter 40 causes a carrier wave to be generated thereby and to be radiated from antenna 28. A portion of this carrier is picked up by antenna 26 of the fixed station (FIG. 1) and applied to receiver 44. That portion of the output from receiver 44 above the speech frequency band, which in the absence of a carrier from transmitter 40 of the portable station represents only noise, is transmitted through a high-pass filter 46 and amplified by an amplifier 48. A noise rectifier 50 produces a direct-current signal proportional to the noise contained in that segment of the output of receiver 44 selected by high-pass filter 46. It is well known that in frequency modulation systems the output of noise rectifier 50 varies inversely with the carrier level impressed upon the input of receiver 44. Alternatively, the carrier might be directly detected by passing it through a bandpass filter and rectifier. A threshold switch 52, which for example, could be a binary device such as the so-called Schmitt trigger circuit, produces a relay-operating voltage when the noise at the output of noise rectifier 50, falls below a prescribed level, indicating reception of a carrier from the portable station. The voltage produced by threshold switch 52 drives the coil of a relay 54 which, in turn, closes associated contact pairs 56, 58, and 60. Contact pair 56 completes a circuit between an independent energizing source (a battery 62) and the coil of relay 54. Thus, relay 54 is "latched." If threshold switch 52 changes state due to loss of radio contact with the portable station, relay 54 remains energized. Contact pair 58 completes a connection between central office 10 and the fixed station which is to endure until the termination of the call. Closure of contact pair 58 also changes the signaling condition on line 12 to indicate a busy line. In the instant case, the signaling condition is changed from a direct-current open line to a direct-current low resistance across line 12 created by the circuit branch formed through contact pair 58, a normally closed contact pair 68, associated with a relay 90 (to be described below), and a hybrid coil 66, itself having a low direct-current resistance.

Speech from central office 10 then can be transmitted to hybrid coil 66, having associated with it an anti-sidetone network 65. From hybrid coil 66 speech is coupled to transmitter 24 and conveyed to the portable station modulated upon the radio frequency carrier generated by transmitter 24. At the portable station (FIG. 2), receiver 30 demodulates the speech originating at central office 10. This speech is then reproduced by loudspeaker 34. When the customer speaks into a microphone 42 on handset 36, the resulting electrical signals are applied to transmitter 40 where they modulate the carrier generated by transmitter 40. Receiver 44 at the fixed station (FIG. 1) demodulates the modulated signal received from the portable station. The resulting speech signal is applied through a low-pass filter 64, designed to cut off above the highest speech frequency component, and is coupled through hybrid coil 66, contact pair 68, and a contact pair 58, associated with latched relay 54, to central office 10.

If transmission from the fixed station to the portable station becomes disrupted, the noise output from receiver 30 (FIG. 2) increases markedly. A segment of this noise energy is selected by a high-pass filter 69, applied to an amplifier 70, and rectified by a noise rectifier 71, the output of which is connected to the coil of relay 72. When the noise transmitted through high-pass filter 69 exceeds a prescribed value, which can be controlled by adjustment of the pull-in voltage of relay 72, contact pair 74 associated with relay 72 closes, impressing the output $f_3$, from an audio-frequency oscillator 76 upon loudspeaker 34. This alarm signifies to the customer using the portable station that disruption of the radio link has occurred, and suggests to him that he relocate in order to re-establish radio contact. A contact pair 75 that closes upon removal of handset 36 from its hook is connected in series with the output of oscillator 76, thus preventing this alarm from sounding when handset 36 is on-hook. When relay 72 becomes actuated loudspeaker 34 is disconnected from receiver 30 by opening of contact pair 77. Thus a squelch function is provided at the portable station.

If the carrier generated by transmitter 40 fails to arrive at the fixed station, the noise at the output of receiver 44 (FIG. 1) increases and the output from noise rectifier 50 rises to drive the coil of a relay 78. The circuit for energizing relay 78 is completed through contact pair 60 of latching relay 54. Thus, relay 78 can be energized only after coil 54 has been latched upon initial receipt of a carrier of satisfactory level from the portable station transmitter. Relay 78, when energized, closes contact pair 80 and impresses the output, $f_1$, from an audio-frequency oscillator 82 upon the input to transmitter 24. This alarm is communicated to the portable station over the described radio link and applied to loudspeaker 34 (FIG. 2), informing the user of the portable station of disruption in the radio contact from his station to the fixed station. The reduction in carrier level occurring at the fixed station that will trigger the alarm signal, $f_1$, is controllable by adjustment of the pull-in voltage of relay 78 (FIG. 1).

When the call is completed, indication to central office 10 that the line is idle is controlled from the portable station irrespective of the origin of the call. When the user of the portable station hangs up his handset 36 (FIG. 2), contact pair 38 is closed, impressing the output, $f_4$, of an oscillator 84 upon the input to transmitter 40. Relay 100 is the slow release type, thus permitting the idle line indicating signal, $f_4$, to be conveyed to the fixed station before transmitter 40 is disabled by opening of contact pair 102. At the fixed station, the idle line indicating signal, $f_4$, resulting from demodulation in receiver 44 (FIG. 1), is transmitted through high-pass filter 46 and amplified in amplifier 48. A bandpass filter 86, tuned to the frequency of the idle line indicating signal, $f_4$, transmits this signal to a rectifier 88 that produces a direct-current voltage to actuate the coil of a relay 90. The actuation of relay 90 opens contact pair 92, thus de-energizing relay 54. When the carrier from transmitter 40 (FIG. 2) is turned off by opening of contact pair 102, threshold switch 52 (FIG. 1) changes state contemporaneously with the release of relay 90. As a result, the signaling condition on line 12 is changed to indicate to central office 10 an idle line status until another call to or from the portable station is initiated.

If the radio link from the portable station to the fixed station is disrupted during transmission of the idle line indicating signal, a low direct-current impedance condition across line 12 at the fixed station persists. Since the user of the portable station has hung up his handset 16, to his knowledge the line is cleared for new calls to arrive from the central office. However, so far as central office 10 is concerned the mobile customer's line is busy. Thus, no incoming calls can be handled unless or until the user of the portable station initiates an outgoing call, and successfully executes a change of status indication at its termination. This dilemna is obviated by the circuitry of the fixed station of FIG. 1 because contact pair 60 is closed at all times that the fixed station is connected to central office 10, maintaining a connection of the coil of relay 78 across the output of noise rectifier 50. So, when transmitter 40 of the portable station (FIG. 2) ceases to emit a carrier, the output of noise rectifier 50 (FIG. 1) rises and relay 78 energizes to close contact pair 80. Alarm signal, $f_1$, is thus impressed on the input of transmitter 24 and the customer at the portable station is alerted to the fact that the disconnecting operation was not successful by reproduction of alarm signal, $f_1$, by loudspeaker 34 (FIG. 2). He then realizes he should attempt to execute a successful disconnection by removing handset 36 from its hook and hanging up again, changing his location with respect to the fixed station if necessary.

When the customer of the portable station wishes to initiate a call, he picks up his handset 36 (FIG. 2), thus energizing transmitter 40. Then, he dials with a conventional dialing unit 94, causing a pulsed output from oscillator 84 to appear at the input to transmitter 40. At the fixed station this dialing signal is separated by bandpass filter 86 (FIG. 1) applied to rectifier 88 and employed to intermittently energize the coil of relay 90. Relay 90 controls the state of contact pair 68 which sends pulsed dial signals through to central office 10. It will be noted that contact pair 58 is closed during the dialing operation because the reception of the carrier from transmitter 40 (FIG. 1) has caused threshold switch 52 (FIG. 1) to drive relay 54 into an energized state. The release time of relay 54 is long enough to prevent disconnection when contact pair 92 opens during the dialing operation.

Low-pass filter 64 is designed to have a cutoff point coincident with the cutoff point of high-pass filter 46. Both high-pass filters 46 and 69 cut off above the band of speech frequencies to prevent actuation of the noise detection circuitry by speech. Moreover, the passbands of receivers 30 and 44 are each designed to produce a passband at the output thereof that extends substantially above the cutoff frequencies of high-pass filters 46 and 69 so that sufficient noise energy is present to drive the noise circuitry at the appropriate times.

As disclosed, the alarm indicating failure of transmission from the fixed station to the portable station is operative during intervals between calls as well as while calls are in progress. If it is desired to conserve power at the fixed station, transmitter 24 can be turned off between calls. This can be carried out by providing two, normally-open contact pairs, one controlled by the coil of relay 18 and the other by the coil of relay 54, connected in parallel between the power supply that energizes transmitter 24 and the power consuming circuitry of transmitter 24. The alarm indicating failure of transmission from the fixed station to the portable station is only operative while calls are in progress, if this modification is made. To prevent false actuation of the alarm circuitry, it should then be modified by placing a normally-opened contact pair, controlled by the state (on-hook or off-hook) of handset 36, in series with the output of oscillator 76.

The alarm circuits described above are applicable to a wide variety of radio telephone systems. For example, a system employing a plurality of portable stations having radio links with a single fixed unit might easily be adapted to provide the desired alarm features. Moreover, both ends of the radio link could be connected to portable telephone stations in a private communication system.

What is claimed is:

1. A telephone system comprising a central office, a fixed station having a transmitter and a receiver, a portable telephone station having a transmitter and a receiver which form a wireless two-way communication link with said transmitter and said receiver of said fixed station, interconnecting means between said central office and said fixed station, means for actuating an alarm, perceivable at said portable station, when the signal received by said portable station from said fixed station falls below a prescribed level, means at said fixed station for generating an electrical alarm transmissible over the wireless link to said portable station when the signal received by said fixed station falls below a prescribed level, means at said portable station for actuating a sensory indication when said electrical alarm signal is received at said portable station, means located at said fixed station at the commencement of a call involving said portable station for indicating a busy line to said central office, means at said portable station for generating a command signal transmissible over said wireless link to said fixed station, means at said fixed station for removing said busy line indication responsive to said command signal, means at said fixed station for generating an electrical alarm signal transmissible over said wireless link to said portable station when said command has been unsuccessful in removing said busy line indication, and means for rendering a sensory indication at said portable station responsive to said last-named alarm signal.

2. A telephone system comprising a central office, a fixed station having a transmitter and a receiver, a portable telephone station having a transmitter and a receiver which form a wireless two-way communication link with said transmitter and said receiver of said fixed station, each of said transmitters generating a carrier upon which information is modulated for conveyance to the receiver associated with the other station, interconnecting means between said central office and said fixed station, means for detecting the condition of the carrier received at said portable station, means responsive to said detecting means for actuating an alarm, perceivable at said portable station, when the carrier received by said portable station falls below a prescribed level, means located at said fixed station for detecting the condition of the carrier received at said fixed station, means responsive to said last-named detecting means for generating an electrical alarm transmissible over the wireless link to said portable station when the carrier received by said fixed station falls below a prescribed level, and means at said portable station for actuating a sensory indication when said electrical alarm signal is received at said portable station.

3. A telephone system comprising a central office, a fixed station having a transmitter and a receiver, a portable telephone station having a transmitter and a receiver which form a wireless link with said transmitter and said receiver of said fixed station, interconnecting means between said central office and said fixed station, means located at said fixed station at the commencement of a call involving said portable station for indicating a busy line to said central office, means at said portable-station for generating a command signal transmissible over said wireless link to said fixed station, means at said fixed station for opening said busy line indication responsive to said command signal, means at said fixed station for generating an electrical alarm signal transmissible over said wireless link to said portable station when said command has been unsuccessful in removing said busy line indication, and means for rendering a sensory indication at said portable station responsive to said last-named alarm signal.

4. In a wireless telephone system, a telephone central office, a fixed base station, a portable telephone station including a handset, said stations each having a transmitter and a receiver forming a two-way wireless communication link between stations, a source of carrier signals being transmitted at all times that said portable station is in a ready state located at said fixed station, a source of carrier signals being transmitted only when said handset is off-hook located at said portable station, first means for generating an alarm at said portable station when the carrier from said portable station fails to arrive at said fixed station, second means for generating an alarm at said portable station when the carrier from said fixed station fails to arrive at said portable station, a transmission line interconnecting said fixed station with said central office, means upon initial reception of said carrier from said portable station at said fixed station after said handset has been placed off-hook for connecting a low direct-current resistance across said line at said fixed station and for placing in an operable state said first alarm generating means, means at said portable station for generating a command signal transmissible over the wireless link to said fixed station upon replacement of said handset on-hook, and means located at said fixed station responsive to said command signal for opening said line at said fixed station and for disabling said first alarm generating means.

5. In a wireless telephone system, a telephone central office, a fixed station, a portable telephone station including a handset, said stations each having a transmitter and a receiver forming a two-way wireless communication link between stations, a source of carrier signals located at said fixed station, a source of carrier signals being transmitted only when said handset is off-hook located at said portable station, a transmission line interconnecting said fixed station with said central office, first means for generating an alarm at said portable station when the carrier from said portable station fails to arrive at said fixed station, second means for generating an alarm at said portable station when the carrier is transmitted from said fixed station but fails to arrive at said portable station, means upon initial reception of said carrier from said portable station at said fixed station after said handset has been placed off-hook for changing the signaling condition over said transmission line from said fixed station to said central office from a first state to a second state and for placing in an operable state said first alarm generating means, means at said portable station for generating a command signal transmissible ovei the wireless link to said fixed station upon replacement of said handset on-hook, and means located at said fixed station responsive to said command signal for changing the signaling condition over said transmission line from said fixed station to said central office from said second state to said first state and for disabling said first alarm generating means.

6. In a wireless telephone system, a telephone central office, a fixed base station electrically coupled to said central office, a portable telephone station including a handset, said stations each having a transmitter and a receiver forming a two-way wireless communication link between stations, means upon initial reception at said fixed station after said handset has been placed off-hook of a signal from said portable station for changing the signaling condition from said fixed station to said central office from a first to a second state, means at said portable station for generating a command signal transmissible over the radio link to said fixed station upon replacement of said handset on-hook, means located at said fixed station responsive to said command signal for changing the signaling condition from said fixed station to said central office from said second to said first state, and means for actuating an alarm at said portable station when said signaling condition fails to change to said first state upon replacement of said handset on-hook.

7. In a wireless telephone system, a telephone central office, a stationary base station, a portable telephone station, said stations each having a radio transmitter and a radio receiver creating a two-way wireless link between stations, a telephone transmission facility interconnecting said fixed station with said central office, means at said fixed station representing a busy line to said central office during calls involving said portable station, a source of command signals transmissible over said wireless link located at said portable station, said command source being activated at the termination of calls involving said portable station, means at said fixed station responsive to said command signal for representing an idle line to said central office, and means located at said portable station for generating a sensory indication of the failure of said command signal to effect said idle line representation.

8. In a radio telephone system having a fixed radio station connected to a telephone central office and a portable radio telephone station, said stations each having a transmitter and a receiver forming radio links between stations, a source of carrier signals at said fixed station for transmitting information to said portable station, a source of carrier signals at said portable station for transmitting information to said fixed station, means for alternatively generating a busy signal and an idle signal transmissible over the radio link from said portable station to said fixed station actuating at said fixed station corresponding line status indications to said central office, means for generating an alarm at said portable station when the carrier from said portable station fails to arrive at said fixed station or the carrier from said fixed station fails to arrive at said portable station while a busy line is indicated, and means for actuating an alarm at said portable station when said idle signal fails to actuate an idle indication at said fixed station.

No references cited.

ROBERT H. ROSE, *Primary Examiner.*